US007346196B2

(12) United States Patent
Gin

(10) Patent No.: US 7,346,196 B2
(45) Date of Patent: Mar. 18, 2008

(54) ROTATABLE BAY WINDOW SWITCH BOX SURVEILLANCE CAMERA AND ILLUMINATOR FOR FACIAL RECOGNITION

(75) Inventor: Jack Gin, Burnaby (CA)

(73) Assignee: Extreme CCTV International Inc., Bellevill, St. Michael (BB)

( * ) Notice: Subject to any disclaimer, the term of this patent is extended or adjusted under 35 U.S.C. 154(b) by 848 days.

(21) Appl. No.: 10/629,697

(22) Filed: Jul. 30, 2003

(65) Prior Publication Data
US 2005/0025360 A1 Feb. 3, 2005

(51) Int. Cl.
G06K 9/00 (2006.01)
(52) U.S. Cl. ............ 382/118; 348/151; 348/370; 348/373; 382/103; 382/217; 396/427
(58) Field of Classification Search ........... 348/143, 348/150, 151; 382/103, 118, 217; 396/26, 396/427
See application file for complete search history.

(56) References Cited

U.S. PATENT DOCUMENTS 5,121,215 A * 6/1992 Boers et al. ............... 348/373
5,517,236 A * 5/1996 Sergeant et al. ............ 348/143
5,946,404 A * 8/1999 Bakshi et al. .............. 382/103
6,108,437 A * 8/2000 Lin ........................... 382/118
6,735,382 B2 * 5/2004 Schneider .................. 396/427
6,890,110 B2 * 5/2005 Kajino et al. .............. 396/427
6,896,423 B2 * 5/2005 Arbuckle et al. .......... 396/427
7,236,200 B2 * 6/2007 Vernon ...................... 348/370
2003/0185556 A1 * 10/2003 Stiepel et al. .............. 396/427
2004/0075739 A1 * 4/2004 Wada ......................... 348/143
2006/0017842 A1 * 1/2006 Jun ............................ 348/373
2007/0115356 A1 * 5/2007 Kang et al. ................ 348/143

FOREIGN PATENT DOCUMENTS

EP 1388802 A2 * 2/2004

* cited by examiner

Primary Examiner—Gregory M Desire

(57) ABSTRACT

A surveillance camera and illuminator are covertly mounted in a partially rotatable bay window inner frame mounted within an electrical switch box. The bay window inner frame can thus be pivoted back and forth to orient the camera toward an entrance to a room in which the switch box is mounted. When the bay window inner frame is rotated to the desired position, a bay window switch box decor cover plate is mounted over the bay window inner frame, engaging it and locking it in the selected position by attachment of the cover plate to the switch box.

12 Claims, 5 Drawing Sheets

ROTATABLE BAY WINDOW SWITCH BOX SURVEILLANCE CAMERA AND ILLUMINATOR FOR FACIAL RECOGNITION

FIELD OF THE INVENTION

This invention relates to unobtrusive and covert surveillance cameras.

BACKGROUND OF THE INVENTION

There exist miniaturized surveillance cameras which can record images in low light and no visible light conditions by means of infra-red illumination. It is common to mount surveillance cameras in a noticeable position, in order to deter illicit activity. But most such surveillance cameras are located high and away from human reach in order to minimize the risk of tampering. Those camera placements often result in unsatisfactory video surveillance where the purpose is to obtain facial recognition of persons, due to the distance to the target area, and due to the position of the cameras taking only top head shots of target persons (who often wear hats). Face shots are preferred and usually essential for identification of a person. It is also sometimes desirable to monitor a location with an unobtrusive or even hidden camera. By keeping the camera concealed, its presence does not interfere with the activity monitored, and can reduce the chance of destruction of the camera by persons who do not wish their activity to be observed by the camera.

Decor plates for electrical switch boxes are now commonly used, but for decorative purposes in a room and not to disguise cameras and illuminators. Bay windows for wide angle movement detector arrays are used in switch boxes to manage automatic light switching, but have not been presented in the partially rotatable configuration of the present invention to provide pointing of a camera and coordinated illuminator system after mounting.

SUMMARY OF THE INVENTION

This invention comprises a surveillance camera mounted in a partially rotatable bay window inner frame mounted within an electrical switch box. The bay window inner frame can thus be pivoted back and forth to orient the camera toward an entrance to a room in which the switch box is mounted. When the bay window inner frame is rotated to the desired position, a bay window switch box cover plate is mounted over the bay window inner frame, engaging it and locking it in the selected position by attachment of the cover plate to the switch box.

In a second stage of the partially rotatable inner frame is mounted an illuminator, which will be turned within the bay window inner frame to illuminate the scene at which the camera is pointed.

The position of typical switch boxes at or near average chest or chin height on a wall adjacent to an entrance to a room is ideal for cameras or infrared illuminators hidden within the switch box, as they are not only at the expected height to target persons standing near the wall, but are also at an excellent height to give good "face-shot" surveillance.

As an option, the camera can be integrated with a video processing system having facial recognition software, which can analyze various features of the face of a person under surveillance and match them with known features of identified people to the point of identification of the person entering the room, or at least categorize them in a database for later comparisons or elimination of suspects having similar or different facial characteristics to or than those recorded.

A further option is to apply sequential shuttering variations in order to capture a variety of exposures of the light information from a face, together with software that discards the less informative exposures and processes the most informative exposures. Because facial recognition depends on fine differences of facial features, it is critical to have the best possible image captured.

There may be lighting advantages as well as covert placement advantages in some situations to having a surveillance device illuminator contained in one such bay window switch box and a surveillance device camera contained in an adjacent or remotely located bay window switch box.

In a preferred embodiment of the invention, a rotatable bay window switch box surveillance camera and illuminator system suited for facial recognition is provided comprising a partially rotatable bay window frame mounted within a standard electrical switch box, a surveillance camera and illuminator mounted within the frame, and a decor bay window cover plate, in which:

a) the bay window frame can be pivoted back and forth to orient the surveillance device toward an entrance to a room in which the switch box is mounted and then locked in the selected position by engagement of the bay window cover plate with the bay window frame front during attachment of the bay window cover plate to the switch box;

b) the camera is mounted in a camera compartment of the bay window frame, the illuminator is mounted in a illuminator compartment of the partially rotatable bay window frame, and both camera and illuminator can be pivoted back and forth with the frame prior to locking in position, for illumination of a scene at which the camera is pointed;

c) the camera compartment is separated from the illuminator compartment by a floor that seals light from the illuminator compartment from entering directly to the camera compartment, the light being directed out a pane of the bay window cover plate for reflection from the scene and return to the camera for imaging of the scene;

d) the camera and illuminator are integrated with a video processing system having facial recognition software, which can analyze various features of the face of a person under surveillance and match them with known features of identified people to the point of identification of the person entering the room;

e) the facial recognition software can analyze various features of the face of a person under surveillance and categorize them in a database for later comparisons or elimination of suspects having similar or different facial characteristics to or than those recorded;

f) the video processing system causes sequential shuttering variations by the surveillance camera in order to capture a variety of exposures of the light information from a face, and the software discards the less informative exposures and proceeds with more informative exposures;

g) the video processing system has the surveillance camera take a series of normal exposures, overexposures, and underexposures by varying the camera's shutter speed or opening electronically, to accommodate unpredictable effects of varying ambient light together with illumination from an illuminator on faces or other objects sought to be recognized;

h) the facial recognition software gives feedback to increase variation in exposure if facial recognition is poor and to decrease the variation in exposure if facial recognition is good.

DETAILED DESCRIPTION

Figure 1:
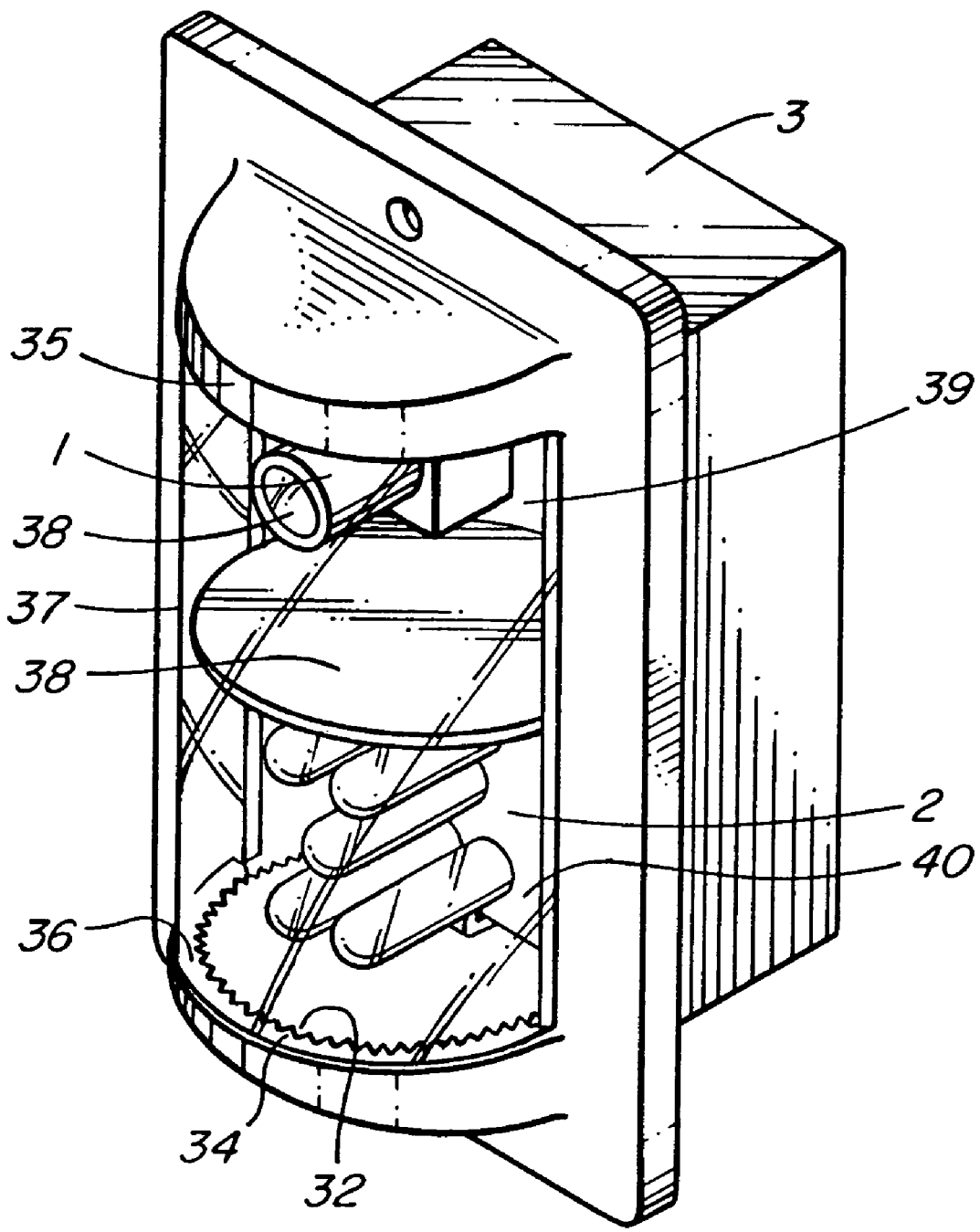
FIG. 1 is an isometric view of a camera and illuminator mounted in respective upper and lower stages of a partially rotatable bay window inner frame, behind a rotational position-locking switch box bay window cover plate.
Figure 2:
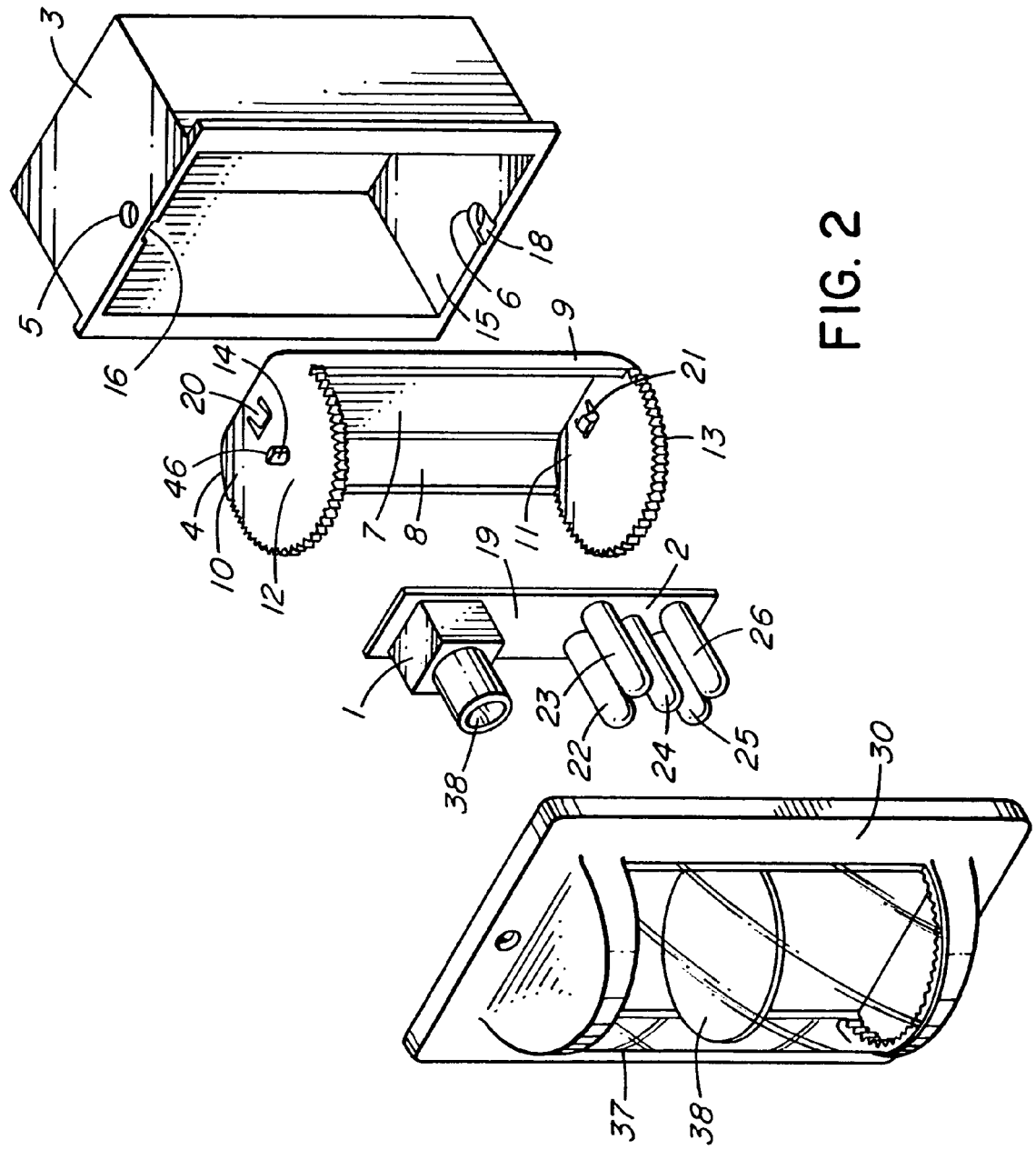
FIG. 2 is an exploded isometric view of the device of FIG. 1.

Referring to FIGS. 1 and 2, the camera 1 and the illuminator 2 are miniaturized such each could fit within half of a standard electrical switch box 3. A pair of pivot holes, with the top pivot hole shown at 5 and the bottom pivot hole shown at 6, are drilled in the top and bottom of the electrical switch box 3. A partially rotatable bay window inner frame 4 is provided. It has a back 7 and side portions 8 and 9 between the rear portions of each of its top 10 and its bottom 11, to make them rigid in the rear portions with respect to the back 7. It has a top front portion 12 and a bottom front portion 13, on each of which is formed a pivot pin (the top pivot pin being shown at 14) that can fit within the top pivot hole 5 and the bottom pivot hole 6 respectively, thereby allowing the bay window inner frame 4 to be partially rotatable within the front portion 15 of the electrical switch box 3. The pivot pin 14 has a sloped top, which allows it to slide readily along top guiding channel 16, the top front portion 12 bending downward during the sliding, and snap into position in the top pivot hole 5. Likewise, a bottom pivot pin 17 (shown in FIG. 4) simultaneously slides along bottom channel 18 while the bottom front portion 13 bends to snap into the bottom pivot hole 6. The camera 1 and the illuminator 2 are mounted on a backing board 19. The backing board 19 snaps into the bay window inner frame behind the sloped retaining clips shown at 20 and 21. The illuminator 2 comprises multiple LED's 22, 23, 24, 25, 26. A curved translucent pane 37 in the decor bay window cover plate resembles a motion detector switch cover, and conceals both the camera 1 and the illuminator 2 from view, yet allows the illumination out and images in to the camera behind the pane. A horizontal wall 38 divides the bay window into a camera stage 39 and an illumination stage 40, extending to and abutting the translucent pane 37, in order to prevent bounce-back effects that would obscure the imaging if the wall were not present and allowed illumination to reflect off the interior of the pane 37 into the camera 1.

Figure 3A:
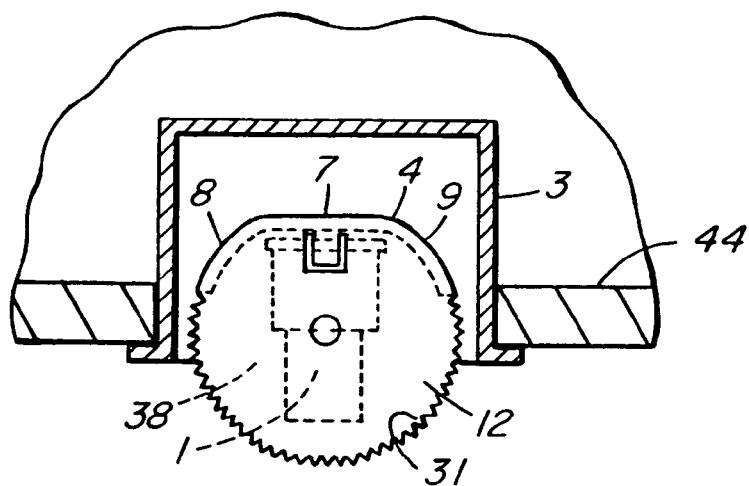
FIG. 3A is a top view of the device of FIG. 1 with the camera pointed perpendicular to a wall in which the device is mounted.
Figure 3B:
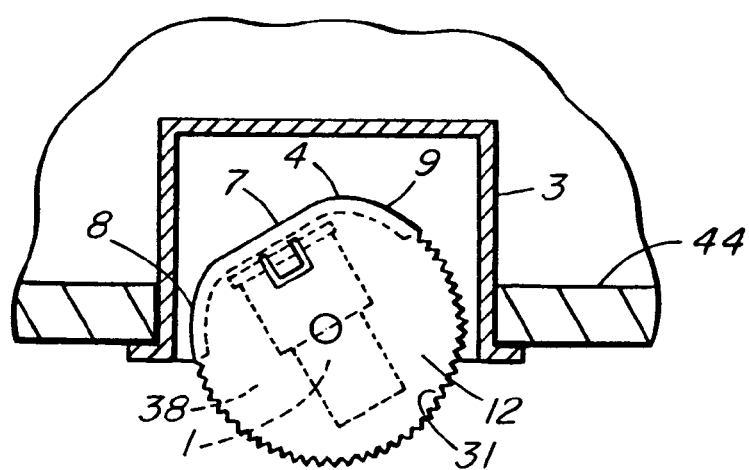
FIG. 3B shows the bay window inner frame partially rotated and locked to point in a different direction.

Referring to FIG. 3A, the camera 1 and illuminator 2 assembly within the partially rotatable bay window inner frame 4 can thus readily be mounted within the electrical switch box 3 after it has been secured empty to a stud in wall 44. The bay window inner frame 4 is then rotated such that the camera 1 points in the desired direction, as shown in FIG. 3B. Often the desired direction will that which will capture face shots of persons who have come through an entrance to a room in which the device is installed.

Figure 3C:
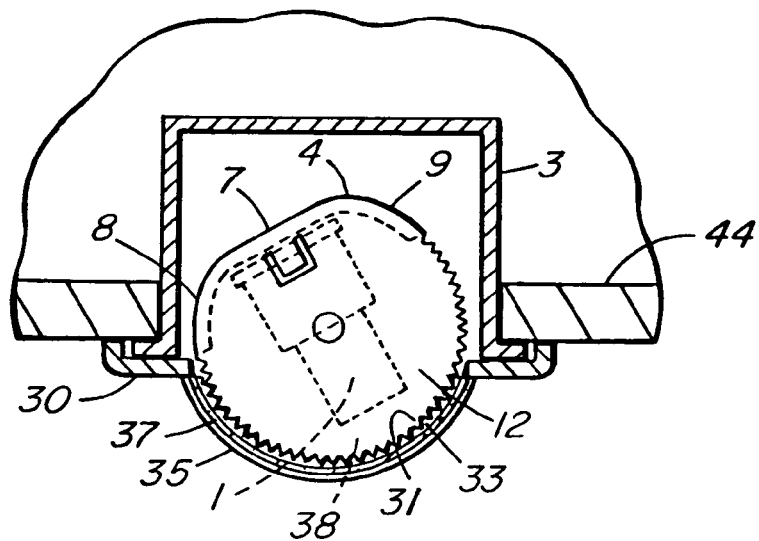
FIG. 3C shows the bay window switch box cover plate is then attached.
Figure 4:
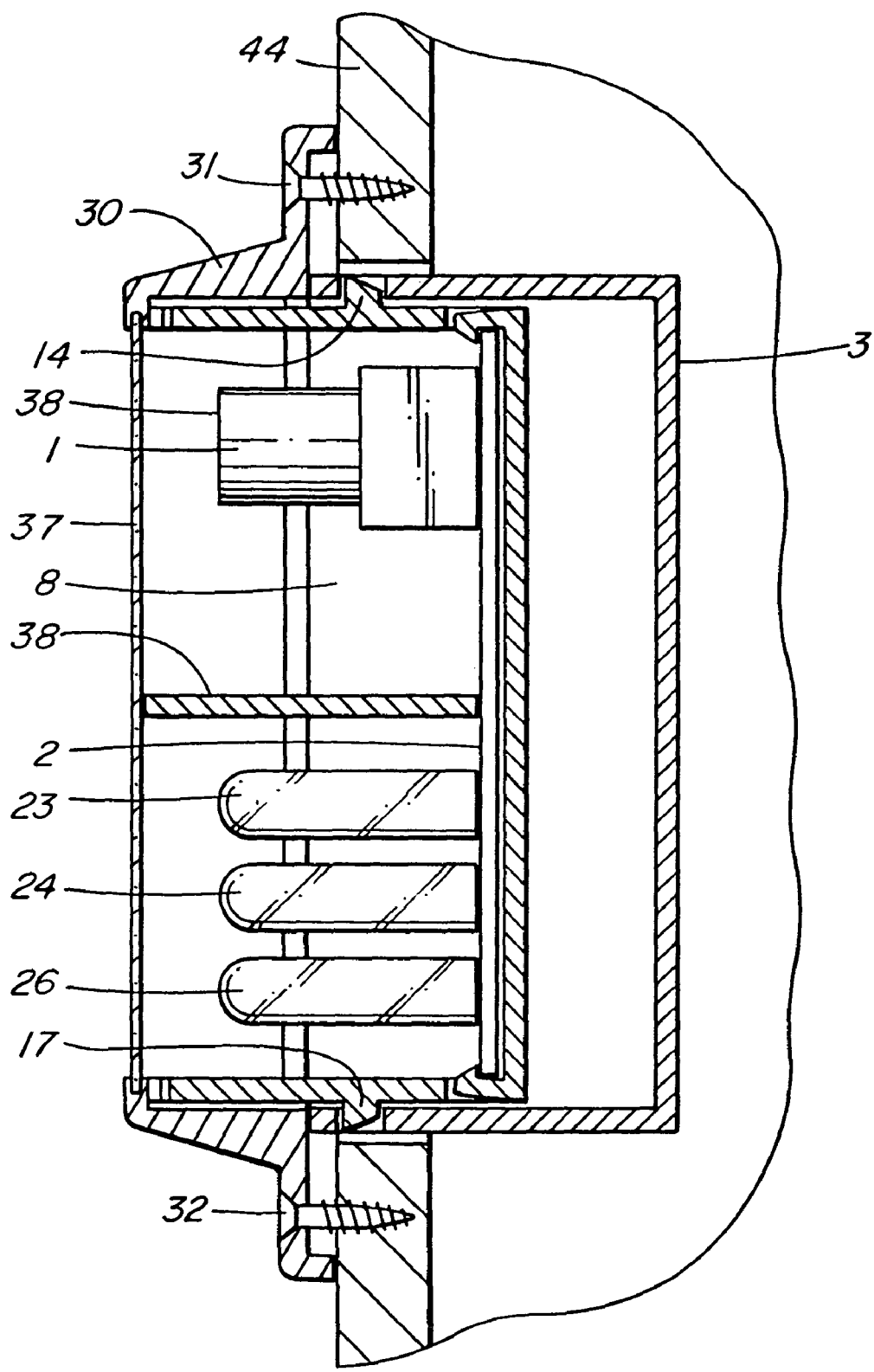
FIG. 4 is a side view of the device of FIG. 1.

Referring to FIGS. 3C and 4, the bay window switch box cover plate 30 is then attached with upper screw 51 and lower screw 52 onto the electrical switch box 3, thereby securing the inner frame 4 by means of the inner frame notches 31 and 32 on each of the top and bottom portions' partially circular front edges fitting within complementary points 33 and 34 in each of the complementary partially circular top and bottom rimmed flanges, 35 and 36 respectively.

With one such double bay window device the camera 1 and the illuminator 2 each point at the same area, but as an option several such devices with additional separate illuminator modules could be installed at various locations within a room to provide multiple-angle lighting.

The illumination could be visible light if that was desired, with camera sensitivity to match, but in most security situations, it would be preferable to use infra-red radiant illumination, with camera sensitivity to match, allowing observation and recording whether there are good or poor visible light conditions. The curved translucent pane 37 can be a dark red to function as an optical screen, passing the infra-red frequencies through to the camera while to some degree obscuring visible light, which allows the camera 1 to be hidden behind the curved translucent pane 37.

The illuminator 2 would typically comprise an array of high efficiency LEDs 22, 23, 24, 25, 26 providing infra-red radiation at 850 or 940 nanometers, powered by either a 12 or a 24 volt alternating current power supply. The LED array thus uses only a few watts of power to provide good video images with a matching CCD camera 1, effective for day or night surveillance under low light and no-light ambient conditions with performance in the infra-red spectrum. A typical lens 38 for the camera 1 would be from 2.5 mm to 16 mm.

The spike protecting regulator board 32 for the illuminator 2 allows for 12 vdc or 24 vac input power. A common power supply could be used for the regulator board 32 for the camera 1. A variable resistor 33 enables a "dimmer switch" 34 to allow the installer to control the light to optimize the picture required at the distance desired. Good picture performance from one foot to twenty feet can be expected.

The curved translucent panel 37 can be a dark red optical screen, making this infra-red camera and illuminator effectively discreet. If desired the translucent panels and the switch plate can be colour-matched to the decor of the room instead.

Figure 5:
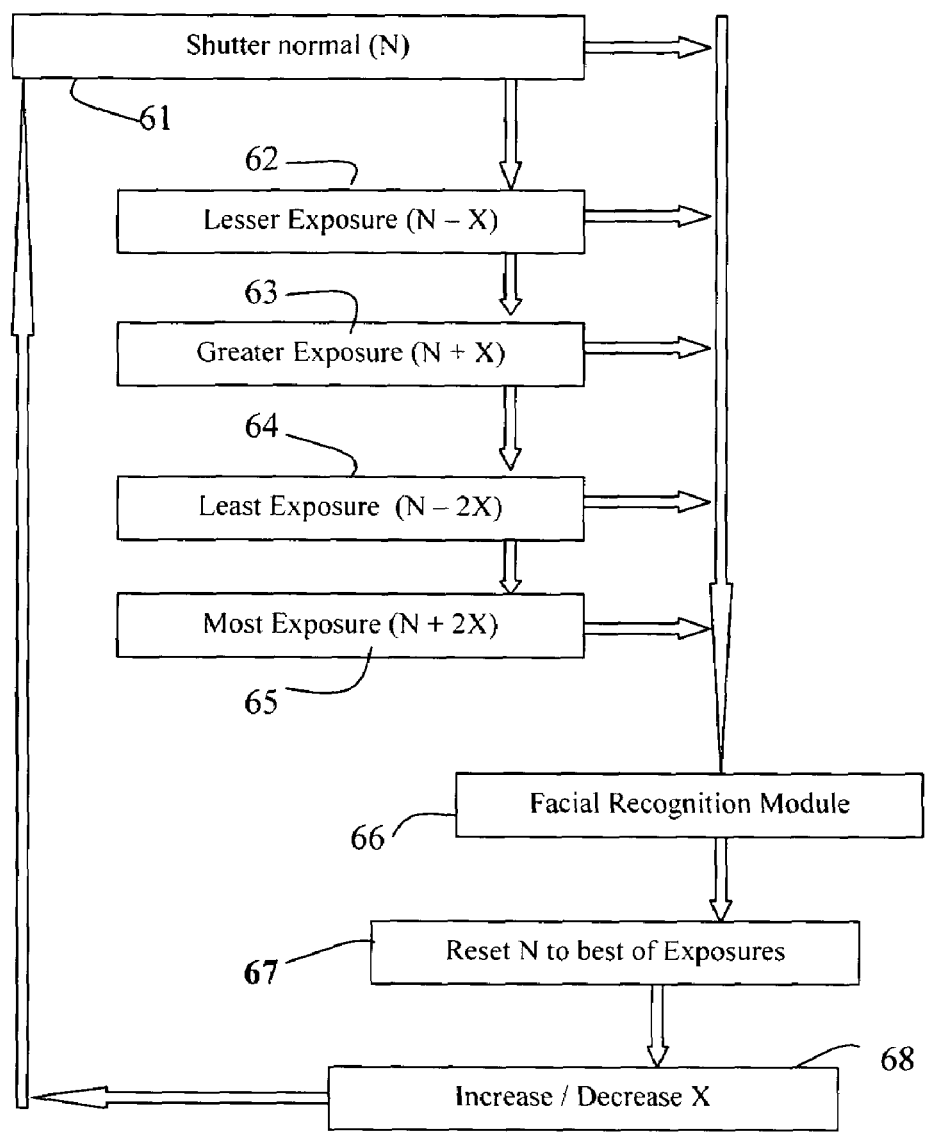
FIG. 5 is a block diagram showing the steps of sequential shutter processing interfaced with facial recognition software.

Referring to FIG. 5, the process of facial recognition by software and database indexing of features observed by the device of FIG. 1 can be enhanced by having the camera take a varying series of exposures by varying its shutter speed or opening, to accommodate varying ambient light effects on the illumination from the device. A predetermined shutter speed/opening that is "normal" for the equipment and anticipated conditions starts the process at block 61. A greater exposure is taken at block 62, while a lesser exposure is taken at block 63. The greater exposure is taken either by slowing the shutter speed or opening up an iris for the lens, both of which are effected electronically. An even greater exposure follows at 64, and an even lesser exposure is taken at 65. A series of such frames are exposed and the data passed to the facial recognition software, which has a facial feature resolution measurement module 66. The assessment of the facial feature resolution data coming into the module gives feedback 67 to block 61, changing its setting to that of the optimum exposure received at module 66. Feedback 68 is given to blocks 62 through 65, causing their exposure settings to increase or decrease (respectively), such that they provide a series of exposures that vary less than initially, but still vary in case the play of light on the face to be recognized changes. If the facial feature resolution becomes poor, the feedback 68 can cause the exposure settings of blocks to vary more widely.

The within-described invention may be embodied in other specific forms and with additional options and accessories without departing from the spirit or essential characteristics thereof. The presently disclosed embodiment is therefore to be considered in all respects as illustrative and not restrictive, the scope of the invention being indicated by the appended claims rather than by the foregoing description, and all changes which come within the meaning and range of equivalence of the claims are therefore intended to be embraced therein.

I claim:

1. A rotatable bay window switch box surveillance camera and illuminator system suited for facial recognition comprising:
   a) a partially rotatable bay window frame mounted within a switch box;
   b) a surveillance device mounted within the frame;
   c) a bay window cover plate;
   in which the bay window frame can be pivoted back and forth horizontally to orient the surveillance device toward an entrance to a room in which the switch box is mounted and then locked in the selected position by engagement of the bay window cover plate with a bay window frame front during attachment of the bay window cover plate to the switch box, the bay window's vertical orientation being defined upon mounting of the switch box and remaining constant during and after pivoting of the bay window for horizontal orientation.

2. The rotatable bay window switch box surveillance camera and illuminator system of claim 1, in which the switch box is a standard electrical switch box adapted for mounting adjacent to an electrical light switch at an entrance to a room at a typical chest height location for users of the room, and the bay window cover plate resembles a decor motion detector switch cover and conceals the surveillance device.

3. The rotatable bay window switch box surveillance camera and illuminator of claim 2, in which:
   a) the surveillance device is a camera and illuminator, the camera is mounted in a camera compartment of the bay window frame, the illuminator is mounted in a illuminator compartment of the partially rotatable bay window frame, and both camera and illuminator can be pivoted back and forth with the frame prior to locking in position, for illumination of a scene at which the camera is pointed;
   b) the camera compartment is separated from the illuminator compartment by a floor that seals light from the illuminator compartment from entering directly to the camera compartment, the light being directed out a pane of the bay window cover plate for reflection from the scene and return to the camera for imaging of the scene;
   c) the surveillance device is integrated with a video processing system having facial recognition software, which can analyze various features of a face of a person under surveillance;
   d) the surveillance camera is integrated with a video processing system that causes sequential shuttering variations by the surveillance device in order to capture a variety of exposures of the light information from the face, together with software that discards the less informative exposures and proceeds with more informative exposures;
   e) the video processing system has the surveillance device take a series of normal exposures, overexposures, and underexposures by varying the surveillance camera's shutter speed or opening, to accommodate unpredictable effects of varying ambient light together with light from the illuminator on faces or other objects sought to be recognized;
   f) the video processing system has facial recognition software, which gives feedback to increase the variation in exposure if facial recognition is poor and to decrease the variation in exposure if facial recognition is good.

4. The rotatable bay window switch box surveillance camera and illuminator system of claim 1, in which the surveillance device is a camera.

5. The rotatable bay window switch box surveillance camera and illuminator system of claim 1, in which the surveillance device is an illuminator.

6. The rotatable bay window switch box surveillance camera and illuminator system of claim 1, in which the surveillance device is a camera and illuminator, the camera is mounted in a camera compartment of the bay window frame, the illuminator is mounted in a illuminator compartment of the partially rotatable bay window frame, and both camera and illuminator can be pivoted back and forth with the frame prior to locking in position, for illumination of a scene at which the camera is pointed.

7. The rotatable bay window switch box surveillance camera and illuminator system of claim 6, in which the camera compartment is separated from the illuminator compartment by a floor that seals light from the illuminator compartment from entering directly to the camera compartment, the light being directed out a pane of the bay window cover plate for reflection from the scene and return to the camera for imaging of the scene.

8. The rotatable bay window switch box surveillance camera and illuminator system of claim 1, in which the surveillance device is integrated with a video processing system having facial recognition software, which can analyze various features of a face of a person under surveillance and match them with known features of identified people to the point of identification of a person entering the room.

9. The rotatable bay window switch box surveillance camera and illuminator system of claim 1, in which the surveillance device is integrated with a video processing system having facial recognition software, which can analyze various features of a face of a person under surveillance and categorize them in a database for later comparisons or elimination of suspects having similar or different facial characteristics to or than those recorded.

10. The rotatable bay window switch box surveillance camera and illuminator system of claim 1, in which the surveillance camera is integrated with a video processing system that causes sequential shuttering variations by the surveillance device in order to capture a variety of exposures of the light information from a face, together with software that discards the less informative exposures and proceeds with more informative exposures.

11. The rotatable bay window switch box surveillance camera and illuminator of claim 1, in which the surveillance device is integrated with a video processing system which has the surveillance device take a series of normal exposures, overexposures, and underexposures by varying a camera's shutter speed or opening, to accommodate unpredictable effects of varying ambient light together with light from an illuminator on faces or other objects sought to be recognized.

12. The rotatable bay window switch box surveillance camera and illuminator of claim 11, in which the surveillance camera is integrated with a video processing system having facial recognition software, which gives feedback to increase the variation in exposure if facial recognition is poor and to decrease the variation in exposure if facial recognition is good.

* * * * *